United States Patent [19]
Chiou

[11] Patent Number: 5,331,356
[45] Date of Patent: Jul. 19, 1994

[54] PORTABLE SPECTACLES

[76] Inventor: Ching-Hae Chiou, No. 5, Sheng An Road, Tainan, Taiwan

[21] Appl. No.: 106,863

[22] Filed: Aug. 16, 1993

[51] Int. Cl.$^5$ .............................................. G02C 5/14
[52] U.S. Cl. .................................... 351/41; 351/112; 351/130; 351/158
[58] Field of Search ................. 351/41, 112, 124, 158, 351/130

[56] References Cited

U.S. PATENT DOCUMENTS

| | | | |
|---|---|---|---|
| 3,526,449 | 11/1967 | Bollé et al. | 351/41 |
| 3,588,236 | 6/1971 | Moller | 351/41 |
| 3,675,991 | 7/1972 | Brenn | 351/41 |
| 3,758,203 | 9/1973 | Lipchik et al. | 351/130 |
| 4,243,041 | 1/1981 | Paul | 351/124 |

FOREIGN PATENT DOCUMENTS

| | | | |
|---|---|---|---|
| 2363116 | 6/1975 | Fed. Rep. of Germany | 351/112 |
| 1162365 | 4/1958 | France | 351/112 |

OTHER PUBLICATIONS

Advertisement "Saf-T-Klip for Spectacles", Paramount Optical Mfg. Corp., New York, Nov. 1, 1949.

*Primary Examiner*—William L. Sikes
*Assistant Examiner*—Huy Mai

[57] ABSTRACT

Portable spectacles to be pinched on a waist band, having a integral frame with a front portion for holding two lenses and two skull temple portions, the front portion provided with an upper flat recess for fixing a connecting means to combine pivotally a pinch means thereon so as to pinch a portion of the waist band by elasticity of a spring provided between the connecting means and the pinch means for carrying the spectacles on the waist band when not in use.

1 Claim, 4 Drawing Sheets

PORTABLE SPECTACLES

BACKGROUND OF THE INVENTION

Common spectacles have a problem of putting away when not in use. Taken off spectacles are often put on a table and forgotten to be carried away, or lost by carelessness.

SUMMARY OF THE INVENTION

This invention has been devised to offer a portable spectacles pinched and carried on a waist band of a user, having desirable features listed as follows.

1. Convenient for carrying, without possibility of losing and falling down.
2. Having a decorative appearance, hung on a waist band.
3. Elastic skull temple portions it has, enabling the spectacles adaptable to be carried on a waist band of a user with different size of waist.

Portable spectacles in the present invention comprise an integral frame with a front portion for holding two lenses and two curved elastic skull temples portions, a connecting means fixed in a flat recess in an upper intermediate edge of the front portion of the integral frame, an L-shaped pinch means being pivotally combined with the connecting means and having a vertical portion and a horizontal portion on the vertical portion. Between the horizontal portion and the connecting means is provided a spring to enable the pinch means to be pull outward or to be released to move back to the original position for pinching a portion of a waist band of a user to hang and carry the spectacles on the waist band.

DETAILED DESCRIPTION OF THE INVENTION

Figure 1:
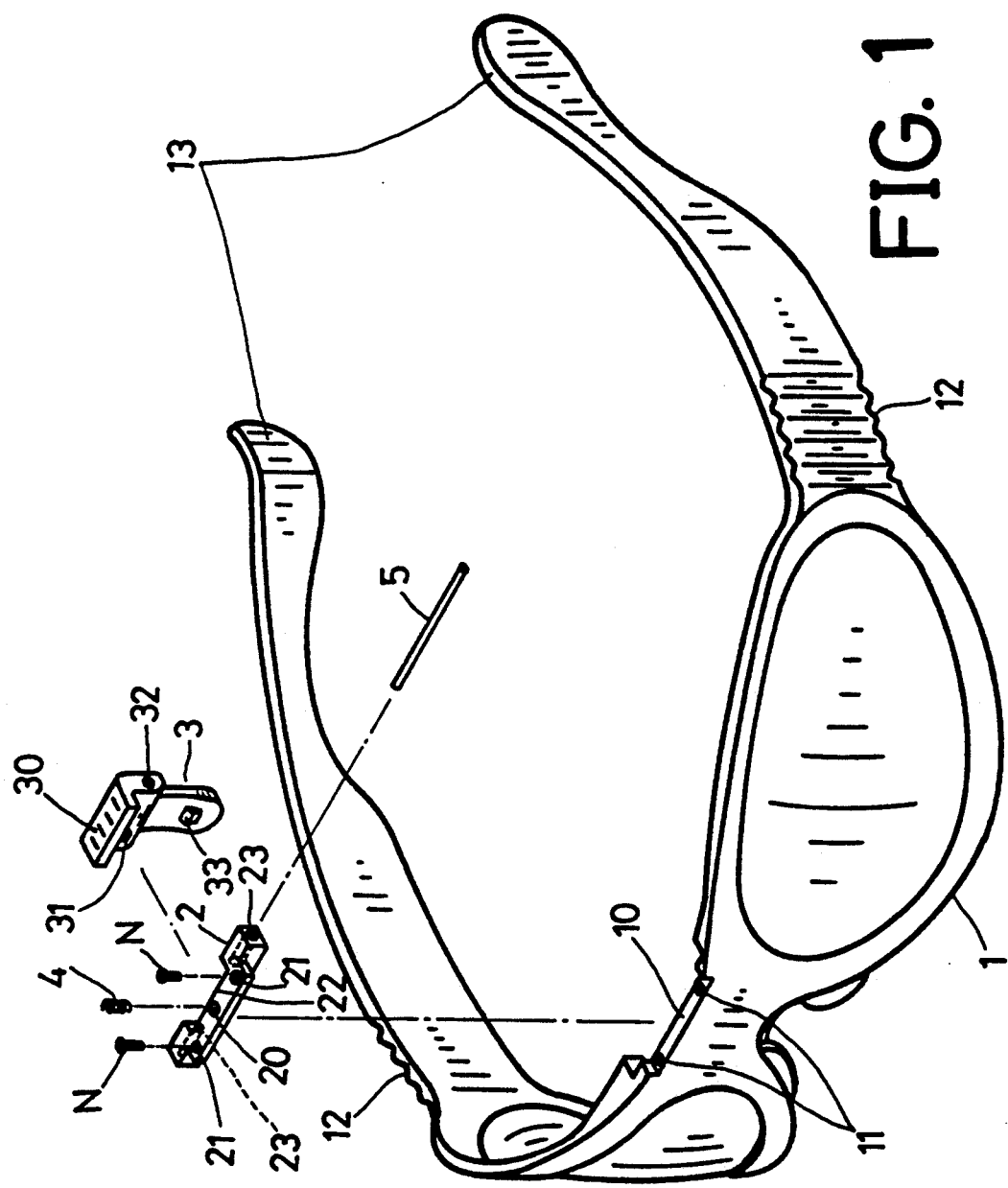
FIG. 1 is an exploded perspective view of a pair of portable spectacles in the present invention.

A pair of portable spectacles in the present invention, as shown in FIG. 1, comprises a frame 1 formed as integral by injection process, a connecting means 2, and a pinch means 3 as components.

The frame 1 has a front portion for holding two lenses and two curved skull temple portions 13, 13 extending from both ends of the front portion, a flat recess 10 in an intermediate upper side of the front portion, two spaced threaded holes 11, 11 in the flat recess 10, a corrugated portion 12 respectively at a front end of each skull temple portion 13.

The connecting means 2 is fixed in the flat recess 10 of the front portion of the frame 1 by means of screws N, N, having a round recess 20 in the middle of an upper side, two threaded spaced holes 21, 21 for the screws N, N to engage, a flat recess 22 in a rear side, and two lateral pin holes 23, 23 in both sides.

The pinch means 3 is pivotally combined with the connecting means 2, having a horizontal portion 30 placed on the connecting means 2, a vertical portion extending from the horizontal portion 30 and beside the central front portion of the frame 1, a projection 31 extending from a lower surface of the horizontal portion 30, two lateral holes 32, 32 in both sides, and a projection 33 on an inner side of a lower portion to urge a surface of a waist band.

A spring 4 is provided between the horizontal portion of the pinch means 3 and the connecting means 2, fitting around the projection 31 of the horizontal portion 30 with an upper end and with the other end inserting in the round recess 20 of the connecting means 2.

A long pin 5 is provided to extend in the lateral pin holes 23, 23, and the lateral pin holes 32, 32 of the pinch means 3, functioning as a pivot, enabling the pinch means 3 compressed on the horizontal portion 30 and the vertical portion to move outward for pinching a waist band between the vertical portion and the front portion of the frame 1.

Figure 2:
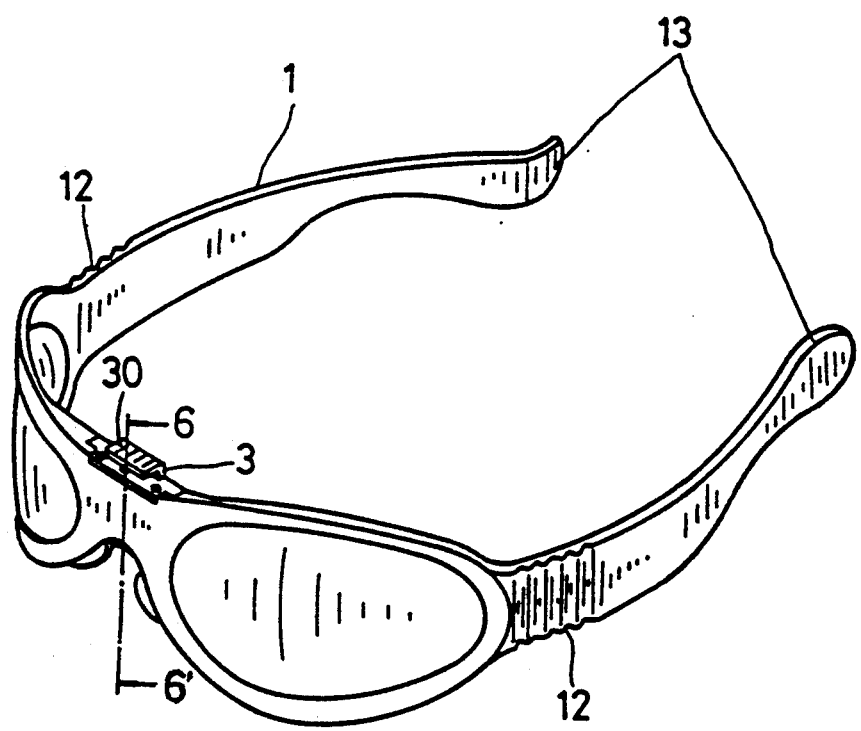
FIG. 2 is a perspective view of the portable spectacles in the present invention.

In assembling, the connecting means 2 is fixed firmly in the flat recess 10 of the front portion of the frame with the screws N, N, and the upper end of the spring 4 is fitted around the projection 31 of the horizontal portion 30 and the lower end thereof is inserted in the round recess 20 of the connecting means 2. Lastly, the pin 5 is inserted through one of the lateral pin hole 23 of the connecting means 2, then through the two lateral pin holes 32, 32 of the horizontal portion 30 and finally through the other lateral hole 23, enabling the pinch means 3 swing with the pin 5 as a pivot, as shown in FIG. 2.

Figure 4:
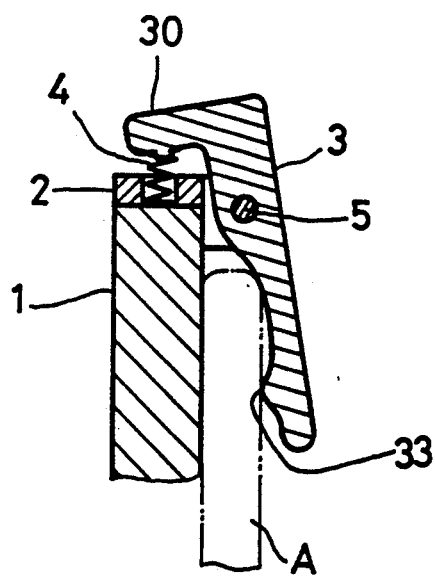
FIG. 4 is a cross-sectional view of line A—A in FIG. 2, showing a pinch means being moved relative to an integral frame.
Figure 5:
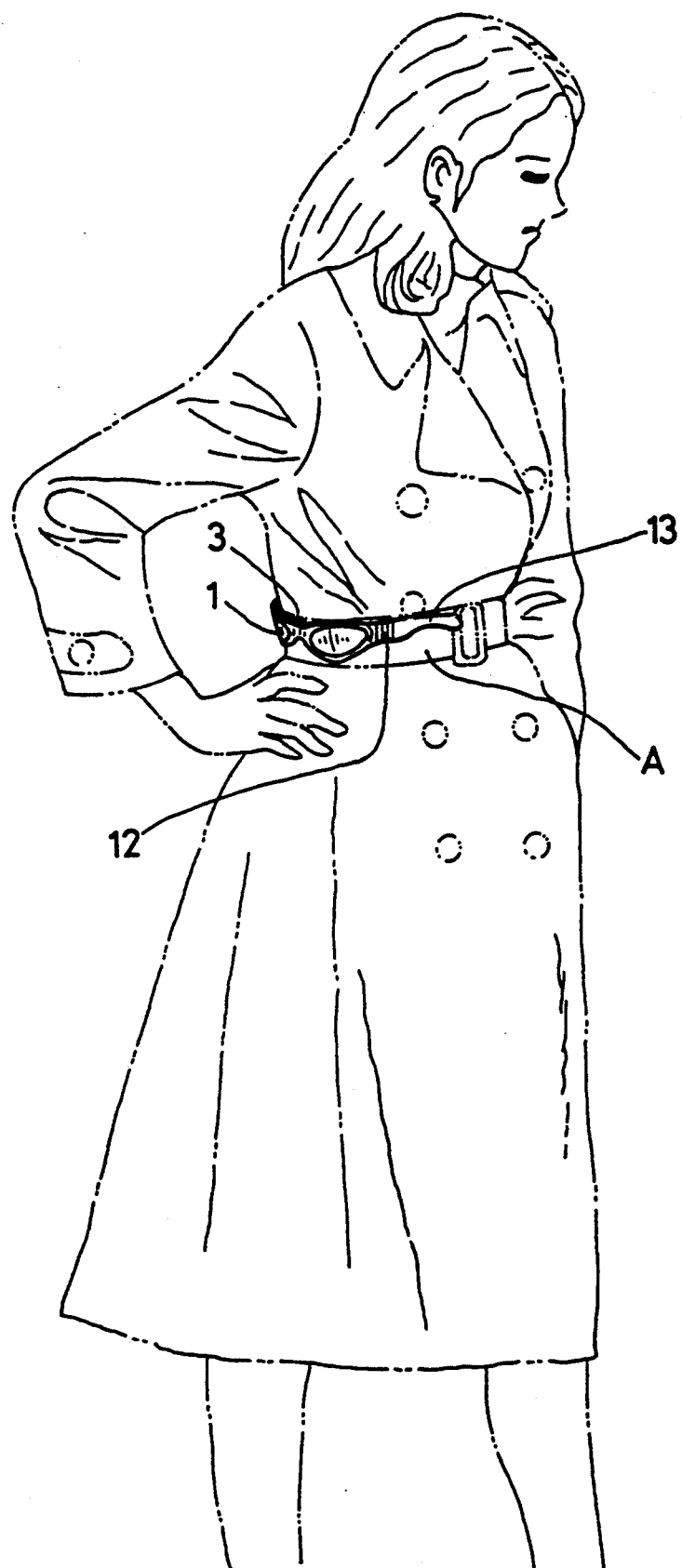
FIG. 5 is a perspective view of the portable spectacles in the present invention hung on a waist band.

In using, as shown in FIGS. 4 and 5, the pinch means 3 is first made to directly pinch a portion of a waist band A, by pressing down the horizontal portion 30 to move the vertical portion outward and letting a waist band insert the space between the frame 1 and the vertical portion of the pinch means 3 and then releasing the pinch means 3, which then moves back to its original position by elasticity of the spring 4, pinching the waist band. Meanwhile, the two skull temple portions 13, 13 with two corrugated portions 12, 12 form an elastic curvature to correspond to the waist band with some tightness without falling off.

Figure 3:
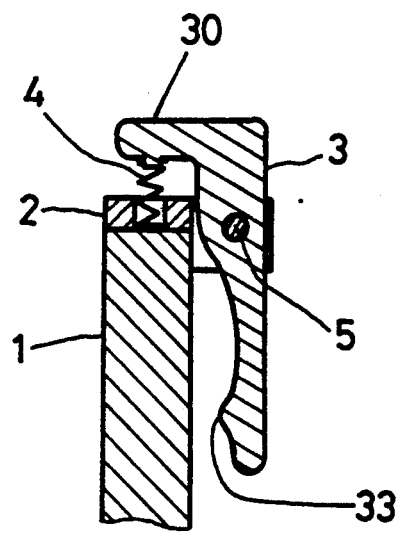
FIG. 3 is a cross-sectional view of line A—A in FIG. 2.

When the spectacles are to be worn, slightly pressing the horizontal portion 30 of the pinch means 3 can free the spectacles from the waist band A, and the pinch means 3 recovers its original position after released, as shown in FIG. 3.

What is claimed is:

1. A pair of portable spectacles comprising;
    an integral frame made of an injecting process, having a front portion for holding two lenses and two skull temples portion extending rearward curvedly from both ends of said front portion, said front portion provided with an upper intermediate flat recess for fixing a connecting means therein, said skull temple portions respectively provided with a corrugated portion at its front end and a curved portion extending rearward from the corrugated portion to the free end;
    a connecting means being fixed firmly with screws in said upper flat recess of the front portion of the integral frame, having two threaded spaced holes in an upper surface for screws to fix the connecting means with the integral frame, a flat recess in a rear side and two lateral pin holes in both ends for a pin to extend therein for combining a pinch means with the connecting means;

a pinch means being pivotally combined with said connecting means, having a horizontal portion at top and a vertical portion extending down from said horizontal portion, said horizontal portion provided with a projection on a lower side for an upper end of a spring to fit around, two lateral pin holes in both ends, and a projection provided on an inner side of said vertical portion;

a spring provided to have its upper end fitting around said projection of said horizontal portion of said pinch means and its lower end inserting in the round recess of said connecting means; and said pinch means being pressed to swing outward a little by elasticity of said spring, pinching a portion of a waist band of a user to hang this spectacles thereon, said two skull temples portions of said integral frame having some elasticity to be expanded to correspond to various curvature of the waist band to be kept thereon without falling off or breaking.

* * * * *